United States Patent [19]
Riesenman et al.

[11] Patent Number: 5,974,571
[45] Date of Patent: Oct. 26, 1999

[54] METHOD AND APPARATUS FOR AVOIDING DEADLOCK IN THE ISSUANCE OF COMMANDS THAT ARE REORDERED AND REQUIRE DATA MOVEMENT ACCORDING TO AN ORIGINAL COMMAND ORDER

[75] Inventors: Robert J. Riesenman, Rancho Cordova; David Harriman, Sacramento; Brian K. Langendorf, El Dorado Hills, all of Calif.

[73] Assignee: Intel Corporation, Santa Clara, Calif.

[21] Appl. No.: 08/941,886

[22] Filed: Sep. 30, 1997

[51] Int. Cl.[6] .................................................. G06F 11/00
[52] U.S. Cl. ............................................................ 714/47
[58] Field of Search ........................... 395/184.1, 185.01, 395/876, 877, 280

[56] References Cited

U.S. PATENT DOCUMENTS

| | | | |
|---|---|---|---|
| 4,378,588 | 3/1983 | Katzman et al. | 710/57 |
| 4,644,463 | 2/1987 | Hotchkin et al. | 710/57 |
| 4,754,399 | 6/1988 | Yamamoto et al. | 710/57 |
| 5,539,914 | 7/1996 | Fry et al. | 395/827 |
| 5,561,823 | 10/1996 | Anderson | 710/57 |
| 5,734,843 | 3/1998 | Gephardt et al. | 710/57 |

*Primary Examiner*—Robert W. Beausoliel, Jr.
*Assistant Examiner*—Pierre E. Elisca
*Attorney, Agent, or Firm*—Blakely, Sokoloff, Taylor & Zafman LLP

[57] ABSTRACT

A method of issuing a data retrieval command to a re-order unit in a bus bridge is described. The method requires maintaining an indication of the available (or unreserved) capacity in a data buffer into which a data package is received from a memory resource in response to a data retrieval command. Data packages are furthermore dispatched, relative to other data packages, in the order in which a corresponding data retrieval command is issued from a requesting device. The size of a data package requested by each data retrieval command is determined prior to issuance thereof to the re-order unit. The size of each data package is then compared to the then available capacity in the data buffer, and the relevant data retrieval command is only issued to the re-order unit if the available capacity in the data buffer is sufficient to accommodate the data package requested by the relevant data retrieval command.

12 Claims, 4 Drawing Sheets

METHOD AND APPARATUS FOR AVOIDING DEADLOCK IN THE ISSUANCE OF COMMANDS THAT ARE REORDERED AND REQUIRE DATA MOVEMENT ACCORDING TO AN ORIGINAL COMMAND ORDER

FIELD OF THE INVENTION

The present invention pertains generally to the field of computer systems. Specifically, the present invention relates to a method of deadlock avoidance for commands that are responded to in an out-of-order fashion, but that require movement to a data destination be in an in-order fashion.

BACKGROUND OF THE INVENTION

Numerous methods have been proposed for achieving the efficient transfer of data retrieval commands and data packages issued in response to those commands, between a requesting device and a memory resource. One such method of increasing the efficiency of command and data package traffic involves establishing a communication protocol between the requesting device and the memory resource in which data packages are returned to the requesting device in the same order which respective data retrieval commands were issued from the requesting device. This allows for efficient streaming of data retrieval commands and data packages as the commands and data packages are identified by their respective locations in the command and data package streams. Accordingly, the requesting device is able to identify which data package was retrieved in response to which command from the order in which the data package is received at the requesting device. A higher degree of communication efficiency is achieved in that identifiers (e.g. memory location addresses) do not have to be associated with each data package so as to allow the requesting device to identify the data packages.

However, in order to increase the rate at which data is retrieved from a memory resource, for example an Extended Data Out (EDO) Random Access Memory (RAM), it may be desirable to re-order data retrieval commands included within a command stream. Specifically, when non-sequential commands address proximate locations in a memory resource, such as locations within a common page of a main memory, it is desirable to re-order such non-sequential commands so that they are received sequentially at the memory resource. By re-ordering the command stream, the overall access time to the memory resource may be reduced as, merely for example, the number of Row Address Strobe (RAS#) assertions and de-assertions and the associated pre-charging of circuitry within the memory source, are reduced.

When the re-ordering of commands occurs, it will be appreciated that the data packages retrieved in response to these commands may have to be re-ordered, prior to propagation to the requesting device, according to the original command order. This re-ordering may occur utilizing a data buffer. It is desirable to reduce the amount of die space dedicated to this buffer within an integrated circuit, and also to reduce the potential for thermal problems in the integrated circuit due to a large data buffer.

SUMMARY OF THE INVENTION

According to the invention, there is provided a method of issuing a data retrieval command to a re-order unit. The method requires determining the available capacity of a first buffer into which a data package is retrieved from a memory resource in response to the data retrieval command. The determination is made as to whether the available capacity of the first buffer is sufficient to accommodate the data package. The data retrieval command is transferred to the re-order unit only if the available capacity of the first buffer is sufficient to accommodate the data package requested by the data retrieval command.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for avoiding deadlock in the issuance of data retrieval commands that are reordered, and that require data movement according to an original command order, are described. In the following description, for the purposes of explanation, numerous specific details are set forth in order to provide a thorough understanding of the present invention. It will be evident, however, to one skilled in the art that the present invention may be practiced without these specific details.

Figure 1:
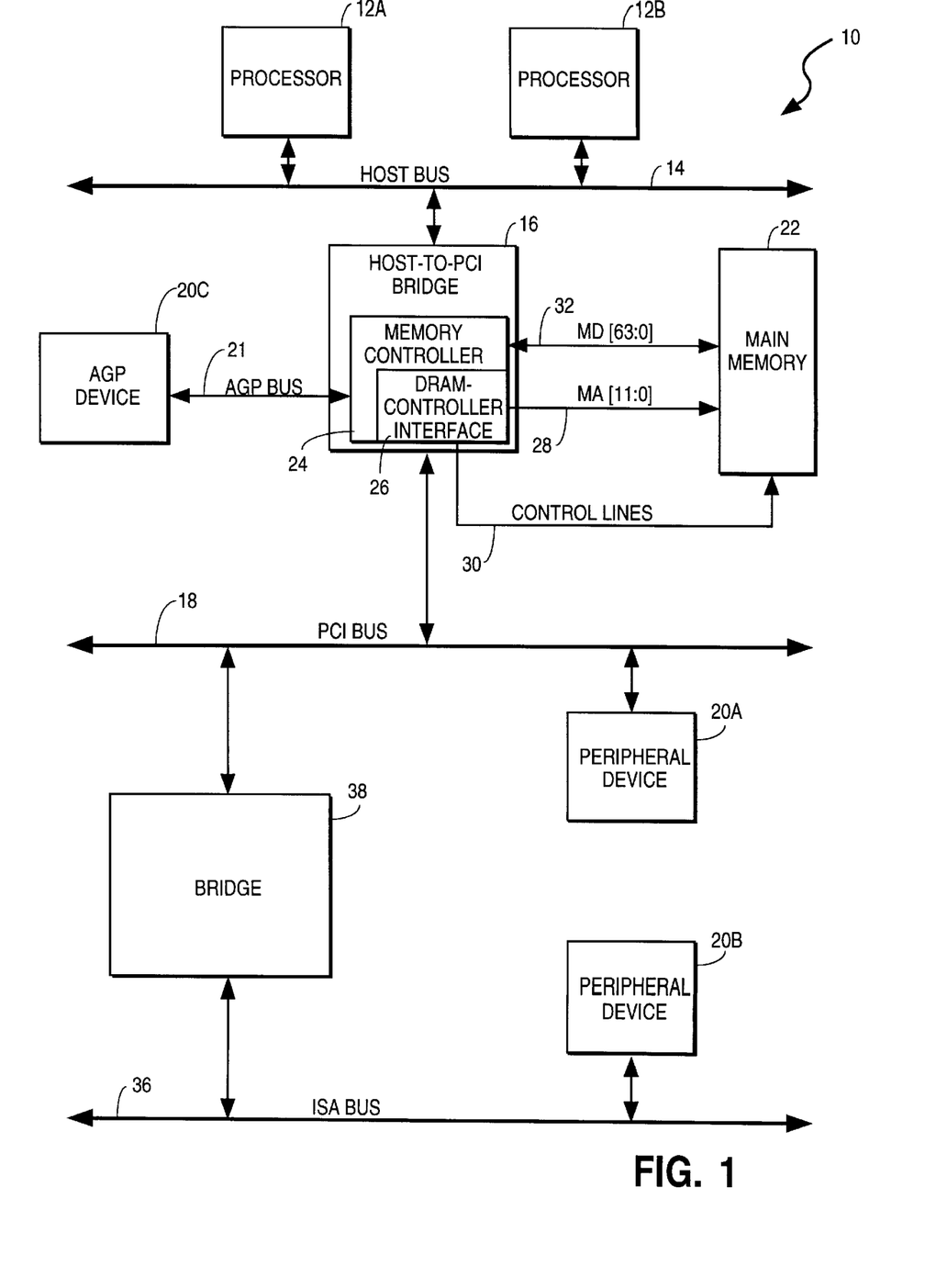
FIG. 1 is a schematic illustration of a computer system in which the present invention may be implemented.

FIG. 1 is a schematic illustration of an exemplary computer system 10. The computer system 10 includes dual processors 12a and 12b, both of which are coupled to a host bus 14. The processors 12a and 12b communicate with the remainder of the computer system 10 via a bus bridge 16, which is coupled between the host bus 14 and a bus, which in the illustrated embodiment comprises a PCI bus 18 operating according to the Peripheral Component Interface (PCI) protocol. It will of course be appreciated that, in other embodiments of the present invention, this bus may operate according to any one of number of other protocols. The bus bridge 16 facilitates effective communication between the processors 12a and 12b and the remainder of the computer system 10, and also facilitates access by both the processors 12a and 12b, and peripheral devices 20a, 20b and 20c, to a main memory 22. Specifically, the bus bridge 16 includes a memory controller 24, which facilitates access to the main memory 22 via a Dynamic Random Access Memory (DRAM) controller interface 26. The memory controller 24 is coupled to the main memory 22 via a memory address bus 28 and control lines 30. Data is outputted from the main memory 22 on a memory data bus 32 to the memory controller 24, which in turn propagates the retrieved data to one or both of the processors 12a or 12b, or via the bus bridge 16 to a peripheral device 20a, 20b or 20c. The computer system 10 includes a further bus, in the form of an Accelerated Graphics Port (AGP) bus 21 via which the bus bridge 16 communicates with the peripheral device 20c, which in the illustrated example comprises an AGP device functioning according to the AGP protocol defined by Intel Corporation of Santa Clara, Calif. The device 20c may, in one exemplary embodiment, comprise the combination of a graphics chip, a local memory and a display port or other device. A number of peripheral devices 20a, of which only one is shown, may be coupled to the PCI bus 18. The computer system 10 may include any number of further busses, such as an Industry Standard Architecture (ISA) bus 36, to which further peripheral devices 20b, conforming to the ISA standard and of which only one is shown, may be coupled. A further bus bridge 38 is shown coupled between the bus 18 and the ISA bus 36 for facilitating communication between peripheral devices 20b coupled to the ISA bus 36 and the rest of the computer system 10.

Figure 2:
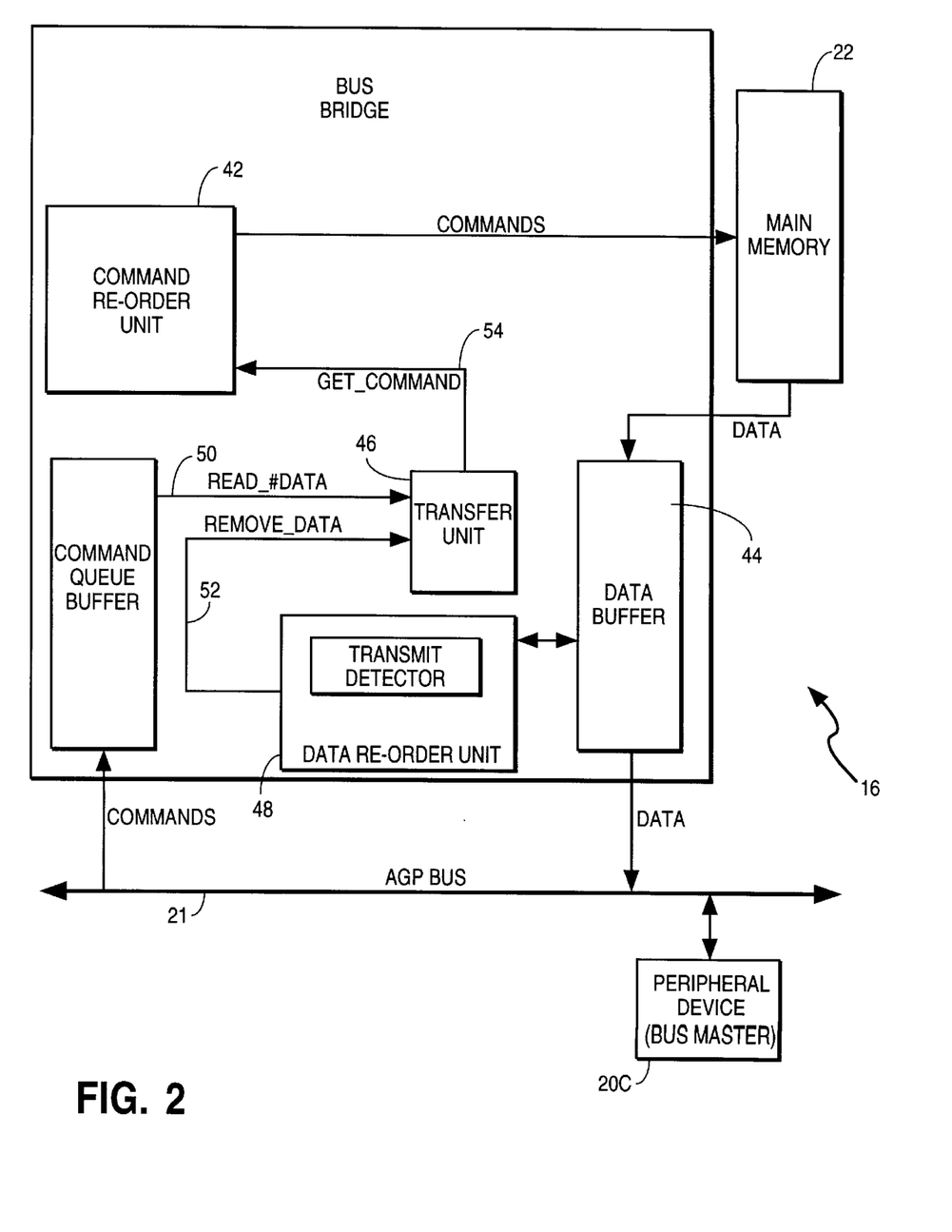
FIG. 2 is a schematic illustration of a bus bridge, according to one embodiment of the present invention, for transferring commands and data between a requesting device and a main memory of the computer system shown in FIG. 1.

Turning now to FIG. 2 there is shown a schematic illustration of a bus bridge 16 configured according to one embodiment of the present invention. The bus bridge 16 is shown coupled to the main memory 22, and also to the AGP bus 21. As mentioned above, the peripheral device 20c may be any one of a number of peripheral devices including, merely for example, a video device having an associated graphics chip and a local memory. The bus bridge 16 is shown to include a number of functional units for facilitating the transfer of data retrieval commands, and data packages retrieved in response to these commands, between the peripheral device 20c and the main memory 22. It will of course be appreciated that the transfer need not be between a peripheral device and the main memory, and the principles of the present invention may be applied to the transfer of data between any requesting data destination and a data source. The relevant functional units are furthermore shown all to be incorporated within the bus bridge 16. It will be appreciated that these functional units may be distributed between various components and integrated circuits within a computer system 10, and need not all be incorporated within a single device, as shown in FIG. 2.

The various function units included within the bus bridge 16 will now be described. The bus bridge 16 includes a command queue buffer 40, a command re-order unit 42, a data buffer 44, a transfer unit 46, and a data re-order unit 48. In order to retrieve data from pre-determined locations in the main memory 22, the peripheral device 20c, acting as a bus master, streams a sequence of data retrieval commands via the AGP bus 21 to the bus bridge 16, where these data retrieval commands are received into the command queue buffer 40. A command queue is maintained within the buffer 40, and comprises the streamed data retrieval commands stored in the order (or sequence) in which these commands were received. In an exemplary embodiment, the peripheral device 20c may be configured to have a maximum of 32 commands "outstanding" (i.e. commands which have been issued, and responsive to which data has not yet been received) at any one time. Accordingly, on receipt of data in response to a previously issued data retrieval command, the peripheral device 20c is able to issue a further data retrieval command. The data retrieval command may specify a location in the main memory 22 from which a data package is to be retrieved, as well as the size of the data package. For example, the command "read, 8000h, len8" specifies that an 8-quadword data package, located at the address 8000h in main memory, is to be retrieved and returned to the peripheral device 20c. For the purposes of this specification, the term "quadword" shall be taken to refer to 8 bytes.

In order to reduce the size of data packages returned to the peripheral device 20c from the main memory 22, a bus protocol, such as the AGP bus protocol, may specify that data packages be returned to the peripheral device 20 in the order in which the respective data retrieval commands were issued therefrom. Thus, the peripheral device 20c is able to ascertain the identity of a data package from the order in which it is returned. Accordingly, the address from which the data package was retrieved need not be transmitted.

However, to enhance the rate at which data is retrieved from the main memory 22 in response to data retrieval commands, it may be desirable to re-order these commands, so that commands which request data from proximate locations are issued sequentially to the main memory 22. For example where the main memory comprises DRAM, when a specific page is open in the main memory 22, it is desirable to issue all commands addressing that page before issuing further commands that address other pages. This facilitates an increased data retrieval rate, as the number of "page-hits" is increased and a faster average memory access time is achieved. Of course, other memory configurations may have other criteria for optimum performance, and in these cases the present invention may address these specific criteria.

To this end, data retrieval commands are propagated in a first in, first out (FIFO) manner to the command re-order unit 42. The re-order unit 42, depending on the locations in main memory 22 addressed by commands, may re-order the commands and issue the commands in an out-of-order sequence to the main memory 22. Data packages are returned from the main memory 22 in response to the data retrieval commands and are received into the data buffer 44. It will be appreciated that, as the data retrieval commands are issued in an out-of-order sequence to the main memory 22, the corresponding data packages will be issued to the data buffer 44 in a corresponding out-of-order sequence. In order to comply with the AGP bus protocol, these retrieved data packages must now be returned to the peripheral device 20c in the order in which the corresponding data retrieval commands were issued therefrom. The re-ordering of the data packages into an in-order sequence, corresponding to the sequence of corresponding data retrieval commands, is performed by the data re-order unit 48, which causes the data packages to be issued from the data buffer 44 to the peripheral device 20c, via the AGP bus 21, in an in-order sequence. The details of the re-order units 42 and 48 are not pertinent to an understanding of the present invention.

It is desirable to reduce the size of the data buffer 44 in order to preserve die space within an integrated circuit and also to avoid heat generation and dissipation problems which are associated with a large buffer. However, to provide an increased throughput of data retrieval commands and corresponding data packages, a large data buffer 44 is desirable. To illustrate this point, consider the example wherein each of thirty-two outstanding data retrieval commands can request data packages ranging in size from between 1 and 32 quadwords. Assuming that, in one exemplary embodiment, thirty-two commands may be outstanding from the peripheral device 20c, a data buffer 44 would have to provide 1024 quadwords of storage (i.e. 32×32 quadwords) to ensure that a deadlock situation would never arise. A data buffer 44 size of less than 1024 quadwords would invoke the possibility of a deadlock. Specifically, it is conceivable that a specific data package issued from main memory, and which is required to be issued next from the data buffer 44, is too large to be stored in the available capacity of the data buffer 44. However, none of the data packages within the data buffer 44 can, in this case, be flushed from the data buffer 44. Accordingly, a data buffer 44 overflow would occur.

The deadlock problem may further be understood by considering the following simplistic and hypothetical scenario where the data buffer 44 has a capacity of 32 quadwords, and where the peripheral device 20c issues sequential commands A and B, each requesting a 32-quadword data package. Moreover, if the command B is issued from the reorder unit 42 prior to command A, the 32-quadword data package requested by command B would be propagated to and received within the 32-quadword data buffer 44. As the 32-quadword data package requested by command A must be returned to the peripheral device 20c before that requested by command B, a deadlock situation now arises, as there is no capacity within the data buffer 44 within which to store the 32-quadword data package requested by command A. To relieve this deadlock situation, one solution would be simply to flush the data package for command B from the buffer 44, and then again to re-issue command B after command A from the re-order unit 42. This flush action is undesirable as it results in wasted memory bandwidth as the same command has to be issued twice. Further, the circuitry required to perform this re-issuing of commands would be complex and die space inefficient.

From the above example, it is apparent that a deadlock situation may arise where a command is issued from the re-order unit 42 while insufficient capacity to accommodate the data package requested thereby exists within the data buffer 44 on account of the data buffer 44 being reserved or occupied by data packages which must be propagated to the peripheral device 20c subsequent to that of the relevant data retrieval command.

One manner to address this problem would be to provide a large data buffer 44. However, in the above example, a data buffer 44 having a capacity of 1024 quadwords would occupy an unacceptably large amount of die space, cause potential thermal problems and increase power consumption. Further, a data buffer 44 of this size would be severely under-utilized for most command patterns.

On the other end of the scale, the smallest storage capacity that could be provided by the data buffer 44, according to the AGP bus protocol, is 32 bytes (i.e. four quadwords). However, a buffer of this size is undesirable in that it prohibits the performance of back-to-back transfers across the AGP bus 21. Secondly, if the size of a data package requested by a command is greater than four quadwords, then wasted idle time would occur on the AGP bus 21 while the next quadword of data is fetched from the memory resource.

The present invention proposes avoiding the above-described deadlock situation by determining whether sufficient capacity exists within the data buffer 44 for a data package requested by a data retrieval command prior to transfer of the relevant data command from the command queue buffer 40 to the command re-order unit 42. In this way, the present invention seeks to achieve an ordering of commands, issued from the re-order unit 42 to the main memory 22, dependent on the availability of capacity within data buffer 44. This ordering ensures that any command that enters the re-order unit 42 is guaranteed space for the data package requested thereby in the data buffer 44.

The transfer unit 46 is responsible for determining both the size of the data package requested by the command prior to issuance thereof to the command re-order unit 42, and the available capacity within the data buffer 44. Having determined the size of the data package and the available capacity, the transfer unit 46 will signal the re-ordering unit 42 to retrieve the sequentially next command from the command queue buffer 40. To this end, the transfer unit 46 reads the length of the data package requested by a relevant command, this size value being represented by the READ_#DATA signal 50. This size value is used both for comparison against the available capacity of the data buffer 44, and for advancing a counter within the transfer unit 46 which tracks the reserved (or "occupied") storage space within the buffer 44. The transfer unit 46 also receives a REMOVE_DATA signal 52 from the data re-order unit 48, which is responsible for the propagation of data packages from the data buffer 44. In response to the comparison of the size of a requested data package and the available (i.e. unreserved) capacity in a buffer 44, the transfer unit 46 may issue a GET_COMMAND signal 54 to the command re-order unit 42, responsive to which the re-order unit 42 retrieves the next available command from the command queue buffer 40. Should the transfer unit 46 determine that insufficient capacity is available within the buffer 44 to accommodate the data package requested by the next available command, the GET_COMMAND signal 54 is not asserted until a further determination is made that sufficient capacity has now become available.

Figure 3:
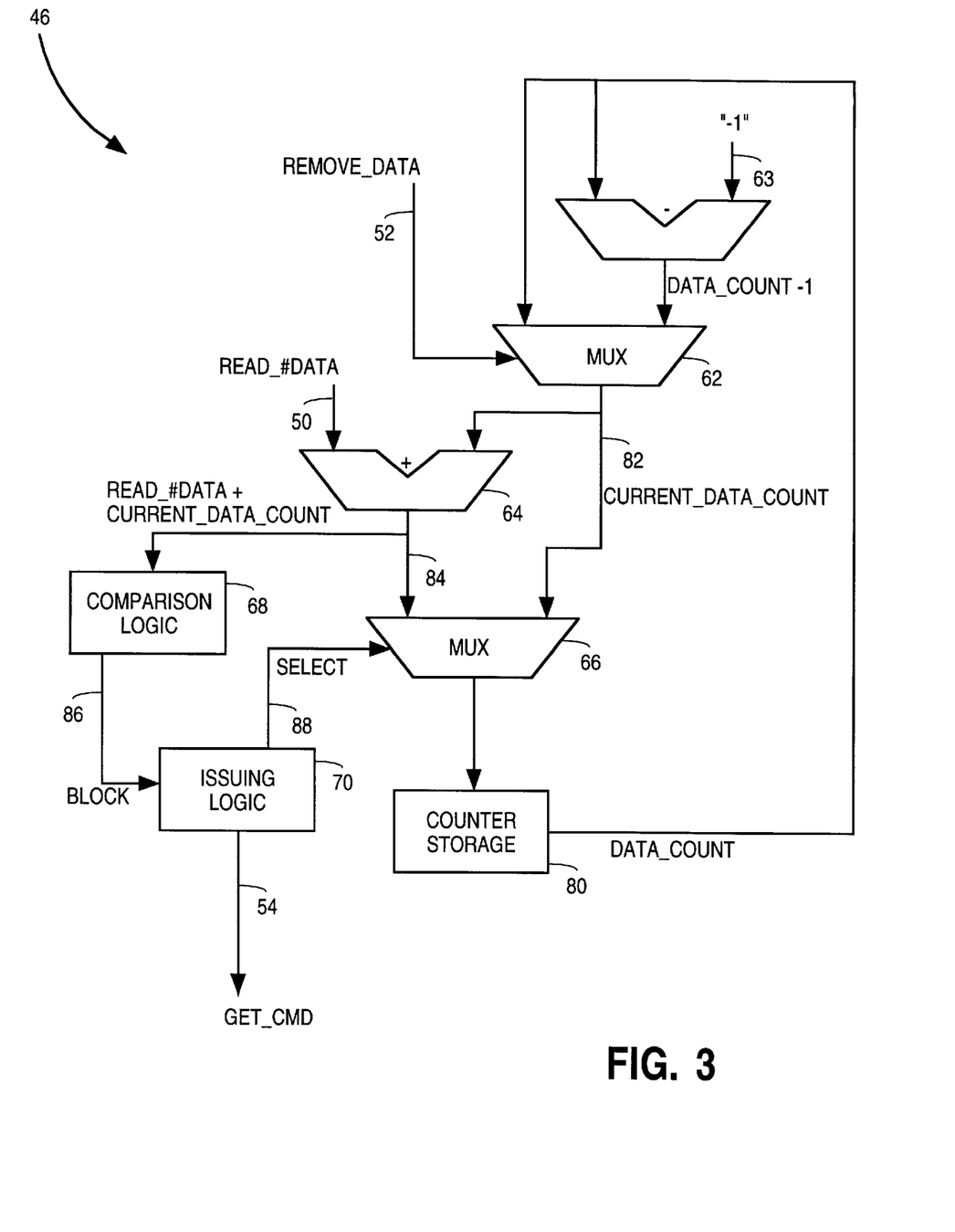
FIG. 3 is a schematic illustration of a transfer unit, according to one embodiment of the invention, included within the bus bridge shown in FIG. 2.

FIG. 3 provides a more detailed schematic illustration of the circuitry, which comprises the transfer unit 46. The transfer unit 46 includes a SUBTRACT multiplexer (MUX) 60, a first MUX 62, an ADDER 64, a second MUX 66, comparison logic 68, issuing logic 70 and count storage 80. The count storage 80 stores a value (DATA_COUNT), which indicates the reserved capacity within the buffer 44, as determined subsequent to a previous action (i.e. either the addition or subtraction of a data package to or from the data buffer 44). The DATA_COUNT value is propagated to both the SUBTRACT MUX 60 and the first MUX 62. The SUBTRACT MUX 60 receives the "−1" signal 63 as a second input, and subtracts this value from the DATA_COUNT value. Of course, the signal 63 may represent any predetermined size of a data package, and could vary from event to event. The MUX 62 is responsive to the REMOVE_DATA signal 52 to select either the DATA_COUNT value or the "DATA_COUNT−1" value as an output, which is designated as a CURRENT_DATA_COUNT value 82. The CURRENT_DATA_COUNT value 82 is fed to both the ADDER 64 and the second MUX 66. The ADDER 64 also receives the READ_#DATA value 50 as an input, and adds this value to the CURRENT_DATA_COUNT value 82 to generate the value 84 (i.e. READ_#DATA +CURRENT_DATA_COUNT). The value 84 is propagated to both the second MUX 66 and the comparison logic 68. In the comparison logic 68, the value 84 is compared against a known maximum capacity of the data buffer 44, to determine whether the value 84 is greater than this known maximum capacity. In this way, the comparison logic determines whether there is sufficient capacity available in the data buffer 44 to accommodate a data package requested by a data retrieval command. Should the value 84 be greater than the known maximum capacity of the data buffer 44, the comparison logic 68 propagates a BLOCK signal 86 to the issuing logic 70. On assertion of the BLOCK signal 86, the issuing logic 70 is disabled from propagating the GET_COMMAND signal 54 to the command re-order unit 42. The issuing logic 70 also asserts or deasserts a SELECT signal 88 to the second MUX 66, so that the MUX 66 propagates either the CURRENT_DATA_COUNT value 82 or the value 84 to the count storage 80, depending on whether the GET_COMMAND signal 54 is asserted. Specifically, if the GET_COMMAND signal 54 is asserted, then the MUX 66 is operated to select the value 84 for storage in the count storage 80 so that the DATA_COUNT value is incremented by the size of the data package (i.e. READ_#DATA) requested by the command issued to the re-order unit in response to the assertion of the GET_COMMAND signal 54. Alternatively, should the BLOCK signal 86 be asserted, the SELECT signal 88 operates the MUX 66 to select the value 82 for storage in the count storage 80.

Figure 4:
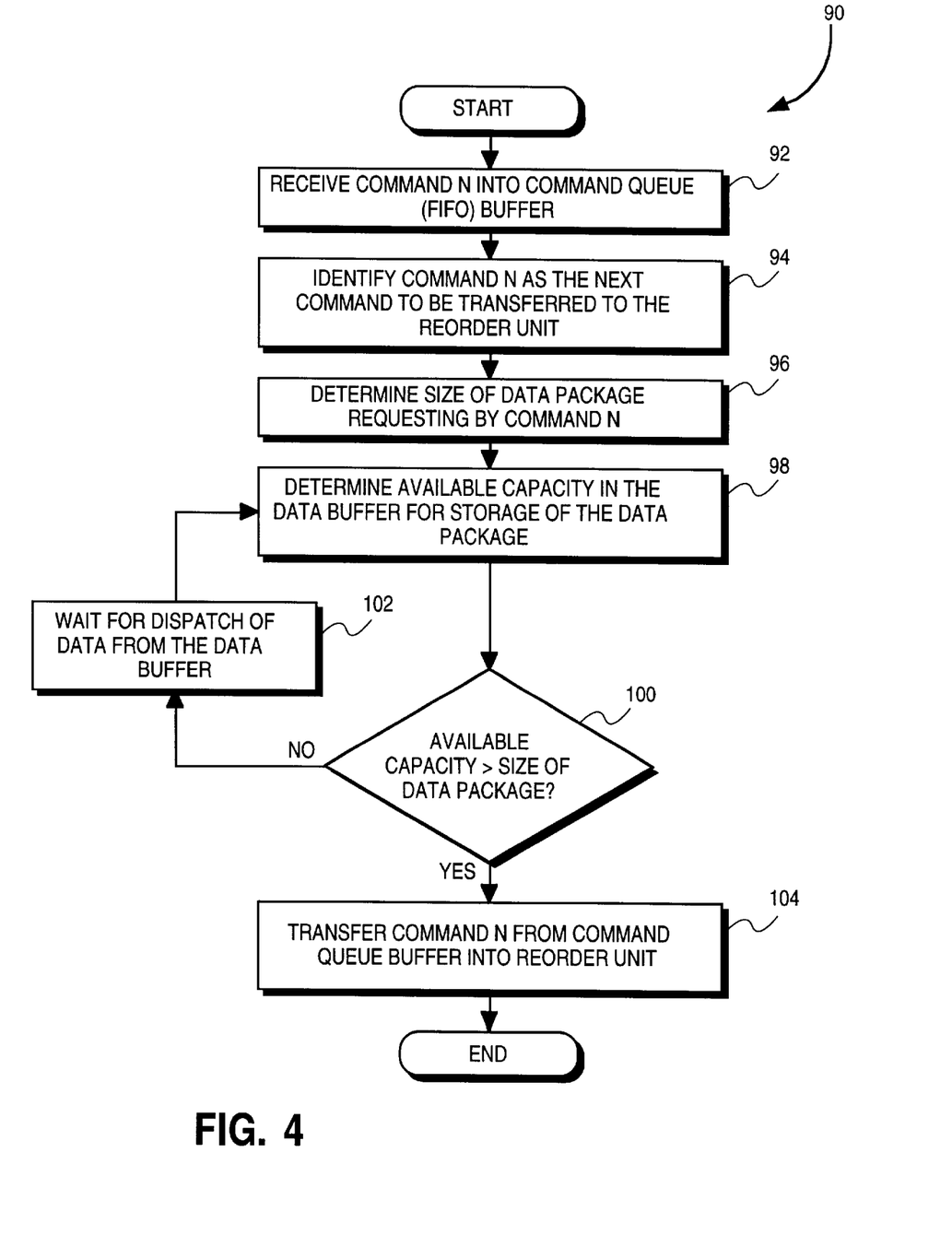
FIG. 4 is a flow chart illustrating a method, according to one embodiment of the present invention, of issuing a data retrieval command to a re-order unit.

Referring now to FIG. 4, there is shown a flow chart illustrating a method 90, according to one embodiment of the present invention, of issuing a data retrieval command to the re-order unit 42. The flowchart illustrates the operations that are performed with respect to a command (command N) as it proceeds through the pipeline proposed by the present invention. At step 92, the command N is received into the command queue buffer 40 from the peripheral device 20. The command queue buffer 40 maintains a FIFO command queue. At step 94, the transfer unit 46 identifies the command N as the next data retrieval command which is eligible to be transferred to the re-order unit 42. At step 96, the transfer unit 46 determines the size of the data package requested by the command N. For example, the transfer unit, by examining the command "read, 8000h, len8", is able to ascertain the size of the data package requested by the command N to be 8 quadwords. At step 98, the available (i.e. unreserved) capacity in the data buffer 44 is determined. At decision box 100, a determination is made as to whether the available capacity of the data buffer 44 is sufficient to accommodate the requested data package. In one embodiment, this determination is made by adding the size of the requested data package to the reserved capacity of the data buffer 44, and assessing whether this summed total exceeds the known maximum capacity of the data buffer 44. If it is determined at decision block 100 that there is insufficient available capacity in the buffer 44 to accommodate the requested data package, the method proceeds to step 102, and waits for the dispatch of data from the data buffer 44 thereby to create or "free-up" the required capacity. On the other hand, should the data buffer 44 have sufficient unreserved capacity to accommodate the requested data package, the method proceeds to step 104 at which the transfer unit 46 initiates the transfer of the relevant command from the command queue buffer 44 to the re-order unit 42 by asserting the GET_COMMAND signal 54. In this way, the potential for a deadlock situation is avoided, in that a command transferred to the re-order unit 42 is guaranteed to be serviceable. Specifically, the invention seeks to guarantee that capacity exists within the data buffer 44 for a data package requested by the transferred command.

Thus, a method and apparatus for avoiding deadlock in the issuance of data retrieval commands that may be reordered, and that require data movement according to an original command order, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of issuing a data retrieval command to a command re-order unit that re-orders a sequence of data retrieval commands prior to the performance of data retrieval operations responsive to the sequence of data retrieval commands, the method including: p1 determining available capacity of a first buffer into which a data package is retrieved from a memory resource in response to a first data retrieval command of the sequence of data retrieval commands;

determining whether the available capacity of the first buffer is sufficient to accommodate the data package; and transferring the first data retrieval command of the sequence of data retrieval commands to the command re-order unit, for reordering within the sequence of data retrieval commands, if the available capacity of the first buffer is sufficient to accommodate the data package requested by the first data retrieval command.

2. The method of claim 1 wherein the transfer of the first data retrieval command to the command re-order unit is stalled if the available capacity of the first buffer is insufficient to accommodate the data package.

3. The method of claim 1 including receiving the first data retrieval command into a command queue prior to issuance to the command re-order unit.

4. The method of claim 3 wherein the command queue is maintained in a second buffer, from which the first data retrieval command is issued to the command re-order unit.

5. The method of claim 1 wherein the determining of whether the available capacity of the first buffer is sufficient to accommodate the data package comprises summing a reserved capacity of the first buffer and the size of the data package to deliver an anticipated total, and comparing the anticipated total to a predetermined maximum capacity of the first buffer.

6. A transfer unit for transferring a data retrieval instruction to a command re-order unit that re-orders a sequence of data retrieval commands prior to performance of data retrieval operations responsive to the sequence of data retrieval commands, the transfer unit comprising:

a counter to maintain an indication of available and reserved capacity of a buffer into which a data package is retrieved from a memory resource in response to a first data retrieval instruction of the sequence of data retrieval commands;

comparison logic, coupled to the counter, to determine whether the available capacity of the buffer is sufficient to accommodate the data package to be retrieved from the memory resource responsive to the first data retrieval instruction; and transfer logic, coupled to the comparison logic, to transfer the first data retrieval instruction to the command re-order unit, for re-ordering within the sequence of data retrieval commands, if the available capacity of the buffer is sufficient to accommodate the data package retrieved responsive to the first data retrieval instruction.

7. The transfer unit of claim 6 wherein the transfer logic is to stall the transfer of the first data retrieval instruction to the command re-order unit if the available capacity in the buffer is insufficient to accommodate the data package.

8. The transfer unit of claim 6 including a further buffer to maintain a command queue, into which the first data retrieval instruction is received, and from which the data retrieval instruction is issued to the command re-order unit in the in-order sequence.

9. The transfer unit of claim 6 wherein the comparison logic sums a reserved capacity of the buffer and the size of the data package to deliver an anticipated total, and compares the anticipated total to a predetermined maximum capacity of the buffer.

10. A bridge unit for issuing data retrieval commands to a memory resource, the bridge unit comprising:

a command buffer to maintain a command queue of data retrieval commands, the data retrieval commands being stored in an in-order sequence as received from a requesting device;

a data buffer to receive data, associated with and in response to, each of the data retrieval commands, and to issue the received data to the requesting device in the order in which the associated data retrieval commands were received into the command buffer;

a command re-order unit, coupled to receive the data retrieval commands from the command buffer in the in-order sequence, the command reorder unit being to re-order the data retrieval commands and to issue the data retrieval commands to the memory resource in an out-of-order sequence; and a transfer unit to transfer each data retrieval command from the command buffer to the command re-order unit only if the available capacity in the data buffer is sufficient to accommodate the quantity of data that will be retrieved in response to a respective data retrieval command.

11. The bridge unit of claim 10 coupled to the memory resource by a memory bus and to the requesting device by a systems bus.

12. A computer system comprising:

a memory resource;

a requesting device to issue data retrieval commands to the memory resource; and a bridge unit coupled between the memory resource and the requesting device, the bridge unit comprising:

a first buffer to maintain a command queque of data retrieval commands issue from the requesting device to the memory resource, the data retrieval commands being stored in an in-order sequence as received from the requesting device;

a second buffer to receive data packages from the memory resource, each data package being associated with and received in response to a respective data retrieval command, the second buffer being to issue each data package to the requesting device in the order in which the associated data retrieval command was received into the first buffer;

a re-order unit, coupled to receive the data retrieval commands from the first buffer in the in-order sequence, the reorder unit being to issue the data retrieval commands to the memory resource in an out-of-order sequence; and a transfer unit to transfer a first data retrieval command from the first buffer to the reorder unit only if the available capacity in the second buffer is sufficient to accommodate the data package associated with the first data retrieval command.

* * * * *

UNITED STATES PATENT AND TRADEMARK OFFICE
CERTIFICATE OF CORRECTION

| | | |
|---|---|---|
| PATENT NO. | : 5,974,571 | Page 1 of 1 |
| APPLICATION NO. | : 08/941886 | |
| DATED | : October 26, 1999 | |
| INVENTOR(S) | : Riesenman et al. | |

It is certified that error appears in the above-identified patent and that said Letters Patent is hereby corrected as shown below:

In column 7, line 66, before "determining", delete "p1".

Signed and Sealed this

Seventeenth Day of July, 2007

JON W. DUDAS
*Director of the United States Patent and Trademark Office*